United States Patent [19]

Honda et al.

[11] 4,404,856
[45] Sep. 20, 1983

[54] STRAIN MEASURING DEVICE

[75] Inventors: Harukichi Honda, Tachikawa; Toshiya Kawada, Komae; Yoshiyuki Tsujitsugu, Tama, all of Tokyo, Japan

[73] Assignee: Kyowa Electronic Instruments Co., Ltd., Tokyo, Japan

[21] Appl. No.: 245,373

[22] Filed: Mar. 19, 1981

Related U.S. Application Data

[63] Continuation-in-part of Ser. No. 28,686, Apr. 10, 1979, abandoned.

[30] Foreign Application Priority Data

Apr. 18, 1978 [JP] Japan .................. 53-46180

[51] Int. Cl.³ .............................................. G01B 7/18
[52] U.S. Cl. ...................................... 73/765; 73/766; 324/105
[58] Field of Search .................. 73/765, 766, 1 B; 324/130, 105

[56] References Cited

U.S. PATENT DOCUMENTS 4,012,953 3/1977 Ormond .................. 73/765
4,054,835 10/1977 Luos et al. .................. 324/130
4,174,639 11/1979 Raven .................. 73/766

Primary Examiner—Anthony V. Ciarlante
Attorney, Agent, or Firm—Owen, Wickersham & Erickson

[57] ABSTRACT

A strain measuring device using a Wheatstone bridge circuit. An excitation voltage changing switch switches from one excitation voltage to a different excitation voltage in accordance with a controlling circuit providing sequence operation of them and of other circuit elements to remove spurious components affecting the measurement of strain. Such spurious components include potential errors due to thermal electromotive force produced inside or outside said Wheatstone bridge circuit and sensitivity error due to drift voltage occurring in the driver circuit of the bridge current source. A comparator may be used to effect judgment of the amount of the measured value of the voltmeter, so that the controlling circuit causes excitation voltage changing switch to select only two excitation voltages out of at least three for switching no matter how many excitation voltages are provided for in the bridge current supply source.

2 Claims, 4 Drawing Figures

STRAIN MEASURING DEVICE

REFERENCE TO RELATED APPLICATION

This application is a continuation-in-part of application Ser. No. 28,686, filed Apr. 10, 1979 now abandoned.

BACKGROUND OF THE INVENTION

1. Field of the Invention

The present invention relates to a strain measuring device able to switch easily the ranges of amount of the strain and which can eliminate the influence of drift voltage produced in a driver circuit of the bridge current source of the strain measuring device using a Wheatstone bridge circuit, and can also eliminate the influence of the thermal electromotive force induced inside or outside the Wheatstone bridge circuit.

2. General Description of the Prior Art

In a conventional strain measuring device using a Wheatstone bridge circuit (hereinafter abridged and referred to as a bridge circuit) an accurate measuring value cannot be obtained when a thermal electromotive force is induced at connections inside or outside of the bridge circuit, because such thermal electromotive force may be applied to the measuring system besides the desired unbalanced voltage, which is in proportion to the amount of the strain to be measured.

Various devices are hitherto known to eliminate such adverse influence of the thermal electromotive force. For instance, a strain measuring device is known in which the polarity of the bridge current source voltage for exciting the bridge circuit is reversed in two successive measurements, and the obtained measuring values are subtracted one from another and divided by two to eliminate the thermal electromotive force. Further it is known to use a measuring device, in which a first measurement is made under the impression of an exciting voltage to the bridge circuit and then a second measurement is made at a condition such that the exciting voltage is interrupted, and the thus-obtained second measurement is subtracted from said first measurement to eliminate the influence of the thermal electromotive force.

In order to provide a clear understanding of the invention, such prior art devices will be explained in more detail below.

SUMMARY OF THE INVENTION

The present invention overcomes the disadvantages of the conventional strain measuring devices.

In accordance with the present invention, the exciting voltage fed to the bridge circuit is switched in time-division manner, and a difference in the two kinds of the excitation voltages applied in time division properly corresponds to a range of the amount of strain. The obtained output voltages derived from the bridge circuit are processed to remove the influence of sensitivity error due to the drift voltage occurring in the driver circuit and the potential error due to the thermal electromotive force produced inside or outside the bridge circuit. Moreover, an object of the invention is to provide a device able to switch the range of the amount of strain very easily.

DISCUSSION OF PRIOR ART

Figure 1:
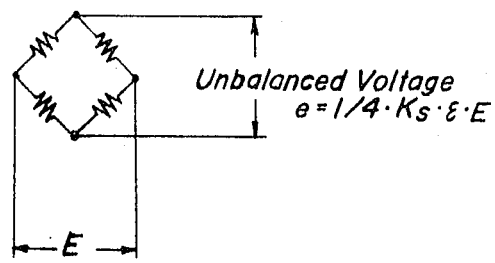
FIG. 1 is a circuit diagram of a bridge circuit using strain gauges.

FIG. 1 shows a diagram of a bridge circuit comprising strain gauges. If we assume the resistance of the strain gauges to be R and an exciting voltage E is applied to the bridge, the resistance R of the strain gauges varies in proportion to the amount of the strain $\epsilon$ and an unbalanced voltage e is obtained which can be expressed by the following equation (1)

$$e = \tfrac{1}{4} \cdot K_S \cdot \epsilon \cdot E \qquad (1)$$

wherein, $K_S$ represents the gauge factor of the strain gauges. In an actual case, various causes of error may be involved, and these errors are added to the value so that the resulting value does not correspond to the value given by the equation (1). Such a practical example will be explained below with respect to FIGS. 2 and 3.

Figure 2:
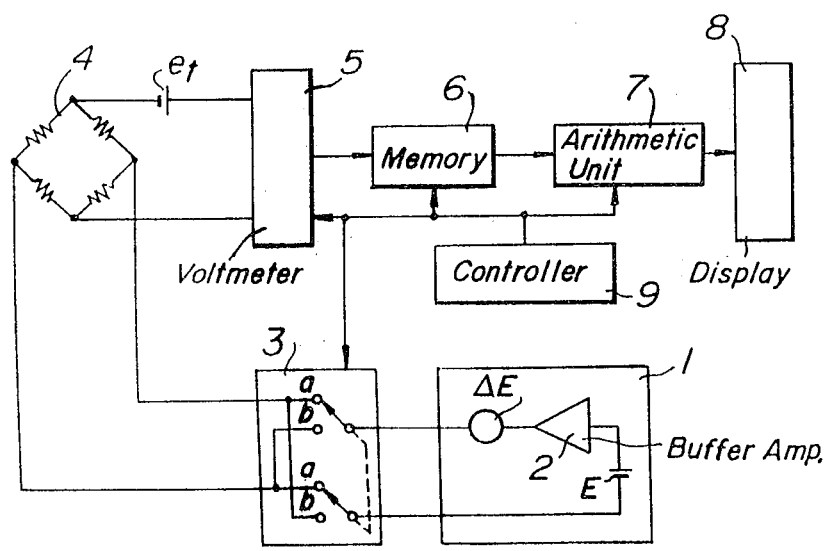
FIG. 2 is a block diagram of a conventional strain measuring device, in which the polarity of the exciting voltage of the bridge circuit is reversed.

FIG. 2 is a block diagram of a conventional strain measuring device in which the exciting voltage of the bridge circuit is reversed. This device comprises a bridge current source 1 for exciting the bridge circuit. It includes an exciting voltage E, a driver circuit or a buffer amplifier 2 and further a spurious voltage $\Delta E$ produced in the various portions of the circuit including the driver circuit (namely, equivalent to the drift voltage). This current source 1 is supplied to the bridge circuit 4 via a polarity reversing switch 3.

The output from the bridge circuit 4 added to a thermal electromotive force $e_t$, induced from connections inside or outside of the bridge circuit 4, is applied to an input of a voltmeter 5. The measured value is temporarily memorized in a memory 6, and this value is processed with another measuring value memorized separately in an arithmetic unit 7, and the processed and obtained strain value is displayed in a display device 8. Control of the overall operation is effected by a controller 9.

At the time of first measurement, the polarity reversing switch 3 is thrown to position "a", and the bridge circuit 4 is excited from the source 1. In the output of the bridge circuit 4, an unbalanced voltage $e_1$ (partly in proportion to the amount of strain but which may also include the aforementioned influence) is obtained, and this voltage may be expressed by the following equation (2).

$$e_1 = \tfrac{1}{4} \cdot K_S \cdot \epsilon \cdot (E + \Delta E) + e_t \qquad (2)$$

In the above equation, $\Delta E$ is drift voltage of the source. The other symbols are the same as explained above for equation (1).

Then the polarity changing switch is placed in position "b", and the bridge circuit 4 is excited. This time, further unbalanced voltage $e_2$, mainly in proportion to the amount of strain, is delivered to the output thereof. This voltage is given by the following equation (3).

$$e_2 = -\tfrac{1}{4}\cdot K_S\cdot \epsilon\cdot(E+\Delta E)+e_t \quad (3)$$

The above voltage values as shown by the equations (2) and (3) are measured at each time by two successive measurements by the voltmeter 5, and the respective measured values are memorized in the memory 6. By using the arithmetic unit 7, the measured value $e_1$ is subtracted by the measured value $e_2$ and the resultant value is divided by 2 to make it $\tfrac{1}{2}$. Thus a processed value $e'$ is given by the following equation (4).

$$e' = \frac{e_1 - e_2}{2} \quad (4)$$

$$= \frac{[\tfrac{1}{4}\cdot K_S\cdot \epsilon\cdot(E+\Delta E)+e_t] - [-\tfrac{1}{4}\cdot K_S\cdot \epsilon\cdot(E+\Delta E)+e_t]}{2}$$

$$= \tfrac{1}{4}\cdot K_S\cdot \epsilon\cdot(E+\Delta E)$$

By this process the influence of the thermal electromotive force $e_t$ can be removed.

Figure 3:
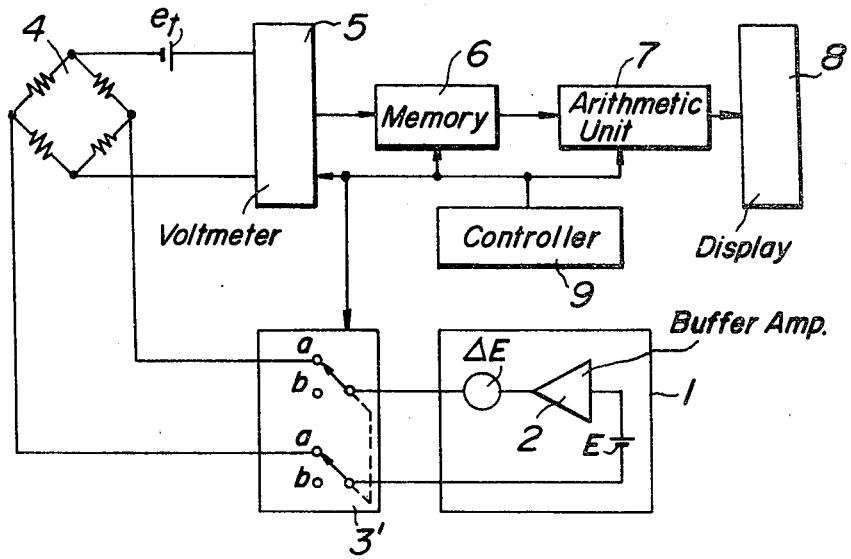
FIG. 3 is a block diagram of another conventional strain measuring device, in which the exciting voltage of the bridge circuit is disconnected.

FIG. 3 shows a block diagram of another conventional strain measuring device which is a type arranged to disconnect the exciting voltage. The circuit shown in FIG. 3 differs from that shown in FIG. 2 only in the provision of a cut-off switch 3' which is to disconnect the exciting voltage source supplied to the bridge circuit when the switch is thrown to position "b". All the remainder of the circuit shown in FIG. 3 is identical with that of FIG. 2.

If the cut-off switch 3' is thrown to position "a" to excite the bridge circuit, it delivers to its output an unbalanced voltage $e_3$ mainly in proportion to the amount of strain. The voltage $e_3$ is expressed by the following equation (5).

$$e_3 = \tfrac{1}{4}\cdot K_S\cdot \epsilon\cdot(E+\Delta E)+e_t \quad (5)$$

Then the switch 3' is thrown to position "b" to disconnect the excitation voltage. In this non-exciting condition of the bridge circuit, an input voltage to the voltmeter assumes a value $e_4$, which is expressed by the following equation (6).

$$e_4 = e_t \quad (6)$$

The above voltage values shown by the equations (5) and (6) are measured by the voltmeter 5 and the respective measured values are memorized in the memory 6. Then the measured value $e_4$ expressed in the equation (6) is subtracted from the value $e_3$ expressed in the equation (5). The resultant value $e''$ is expressed by the following equation (7).

$$e'' = e_3 - e_4 \quad (7)$$

$$= [\tfrac{1}{4}\cdot K_S\cdot \epsilon\cdot(E+\Delta E) + e_t] - (e_t)$$

$$= \tfrac{1}{4}\cdot K_S\cdot \epsilon\cdot(E+\Delta E)$$

In the abovementioned strain measuring devices in which the excitation voltage of the bridge circuit is reversed in polarity, or the excitation voltage of the bridge circuit is cut off in the second measurement, the following disadvantages in various aspects have been observed.

(i) Although the influence of the thermal electromotive force $e_t$ can be removed, as shown in the equations (4) and (7), since such measurement is an absolute measurement by using a single kind of reference voltage as the exciting voltage, the sensitivity error component $\tfrac{1}{4}\cdot K_S\cdot\Delta E\cdot\epsilon$ due to the influence of the drift voltage $\Delta E$ cannot be removed. Any change in the reference voltage causes a change in output sensitivity.

(ii) As for the polarity reversing switch or the exciting voltage cut-off switch, an element having a smaller drift voltage, a very small internal resistance, and a large current capacity is required. This makes the circuit complicated and expensive.

(iii) The switching of the range of amount of strain is required, especially for larger amounts of strain. This causes a requirement that a resistive attenuator be provided in front of the voltmeter, or requires a separate circuit for lowering the reference voltage of the bridge exciting current source. This makes the device expensive.

DESCRIPTION OF THE PREFERRED EMBODIMENTS

Figure 4:
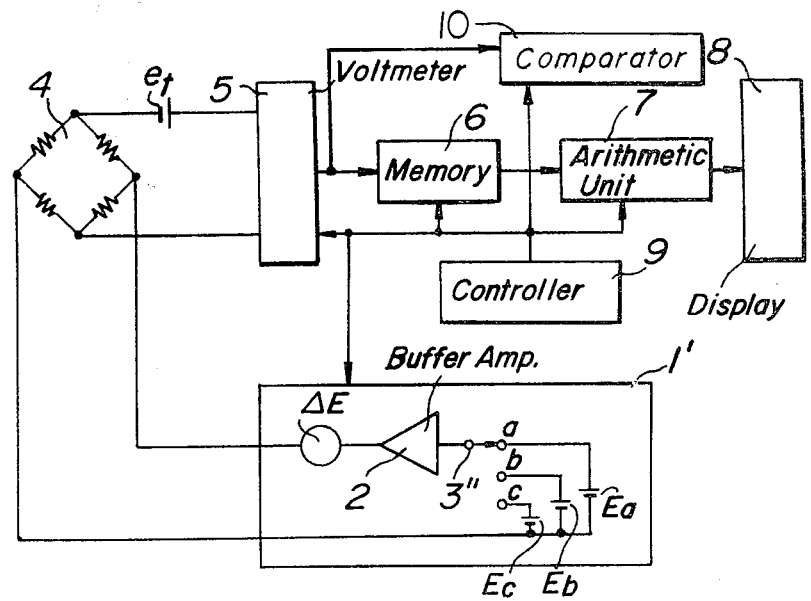
FIG. 4 is a block diagram of a strain measuring device made in accordance with the present invention.

FIG. 4 is a block diagram of one preferred embodiment of the present invention. This circuit mainly differs from that of the circuits shown in FIGS. 2 and 3 in the bridge current supply source 1'. The bridge current supply source 1' comprises a number of different exciting voltages $E_a$, $E_b$ and $E_c$. In the drawing, these voltages are shown as three independent voltage sources. But the voltages $E_b$ and $E_c$ may be derived from the same voltage $E_a$ by subdividing it, for instance using resistance branches or the like. The source 1' further comprises an exciting voltage changing switch 3" and a driver circuit or buffer amplifier 2. The source voltage supplied form this source 1' inevitably contains a spurious voltage produced in the circuit or in the driver circuit 2 as in the circuits shown in FIG. 2 and FIG. 3. The spurious voltage is termed the "drift voltage" and it is equivalently expressed by voltage $\Delta E$.

As a first embodiment, the invention will be explained for a case without range switching. In this case only the exciting voltage sources $E_b$ and $E_c$ are used.

First, a measurement is made by placing the source voltage changing switch 3" at position "b" connected to an exciting voltage $E_b$, and the bridge circuit is excited. The output voltage, mainly in proportion to the strain, assumes an unbalanced voltage $e_5$ and this is expressed by the following equation (8).

$$e_5 = \tfrac{1}{4}\cdot K_S\cdot \epsilon\cdot(E_b+\Delta E)+e_t \quad (8)$$

Then the source voltage changing switch 3" is placed at position "c" connected to an exciting voltage $E_c$, and the bridge circuit is excited. The obtained unbalanced voltage $e_6$ is given by the following equation (9).

$$e_6 = \tfrac{1}{4}\cdot K_S\cdot \epsilon\cdot(E_c+\Delta E)+e_t \quad (9)$$

The above values shown by equations (8) and (9) are measured by the voltmeter 5 and memorized in the memory 6. Then the measuring value $e_6$ is subtracted from the value $e_5$ in the arithmetic unit 7. This processed value $e'''$ is given the following equation (10).

$$e''' = e_5 - e_6 \quad (10)$$

$$= [\tfrac{1}{4}\cdot K_S\cdot \epsilon\cdot(E_b+\Delta E)+e_t] - [\tfrac{1}{4}\cdot K_S\cdot \epsilon\cdot(E_c+\Delta E)+e_t]$$

-continued $$= \tfrac{1}{4} \cdot K_S \cdot \epsilon \cdot (E_b - E_c)$$

When the exciting voltage $E_b$ and $E_c$ are set to have a relation that $E_b - E_c = E$ in the equation (10), or if a factor N is provided in the unit 7 to make $(E_b - E_c)N = E$, an accurate measuring value of the unbalanced voltage can easily be obtained, which is correctly in proportion to the amount of strain as given by the equation (1). Thus it is the difference between the voltage $E_b$ and $E_c$ that is important, not the actual values of the voltages themselves.

If the order of application of the exciting voltages is arranged as $E_c$ to $E_b$, the same result can be obtained.

As a second embodiment, a case with range switching function will be explained.

Further advantage of the device of the present invention may be obtained by setting the relation between the exciting voltages $E_a$, $E_b$ and $E_c$ to be as follows.

$$E_b - E_c = E \text{ and } E_a - E_b = 10E$$

Actual values considered to represent the above-mentioned relationship may be, for instance, as follows.

$$E_a = 2.22\ V$$

$$E_b = 0.22\ V$$

$$E_c = 0.02\ V$$

First, the bridge circuit 4 is excited by placing the voltage changing switch 3" at "b" position having the exciting voltage $E_b$ to produce the bridge circuit output voltage $e_5$ as shown in the equation (8). If the value of the output voltage $e_5$ is found to be too small, when compared with a threshold value (by use of a comparator 10), then the voltage changing switch 3" is switched to the position "a" connected to the exciting voltage $E_a$. An output voltage $e_7$ at this time is given by the following equation (11).

$$e_7 = \tfrac{1}{4} \cdot K_S \cdot \epsilon \cdot (E_a + \Delta E) + e_t \qquad (11)$$

A value $e''''$, obtained by subtracting the value of equation (8) from that of the equation (11), is given by the following equation (12).

$$\begin{aligned}
e'''' &= e_7 - e_5 \qquad (12)\\
&= [\tfrac{1}{4} \cdot K_S \cdot \epsilon \cdot (E_a + \Delta E) + e_t] - [\tfrac{1}{4} \cdot K_S \cdot \epsilon \cdot (E_b + \Delta E) + e_t]\\
&= \tfrac{1}{4} \cdot K_S \cdot \epsilon \cdot (E_a - E_b)\\
&= \tfrac{1}{4} \cdot K_S \cdot \epsilon \cdot 10E = 10 \cdot \tfrac{1}{4} \cdot K_S \cdot \epsilon \cdot E
\end{aligned}$$

As given by the equation (12), an amount ten times that of the desired strain expressed by equation (10) can be obtained. This value does not include the spurious thermal electromotive force produced inside or outside of the Wheatstone bridge circuit nor does it include the drift voltage of the driver circuit of the bridge circuit.

If the unbalanced voltage $e_5$ is a value exceeding a certain level, judged by using a threshold value of a judging circuit or the comparator 10, the measurement may be effected according to the foregoing explanation as explained with equations (9) and (10). If the unbalanced voltage $e_5$ is an excessively large value to saturate the voltmeter 5, for instance by breakage of the gauge, adjustment of exceeding the measurement range may be derived without reading the voltage values as shown in the equations (9) and (10) or (11) and (12).

If three ranges are desired, four kinds of excitation voltages are used. For four ranges, five kinds of excitation voltages are used.

In each case, at first a measurement is made by using the lowest excitation voltage. The measurement value is compared with the threshold value of maximum strain amount and based on that judgment a proper excitation voltage is selected. As a result, only two measurements are required irrespective of the number of excitation voltage ranges.

The strain measuring device as has been explained above has the following advantages.

(i) As can be seen from the equation (10), not only the influence of the thermal electromotive force in the bridge circuit but also the drift voltage of the driver circuit of the bridge supplying source voltage may be removed, and an unbalanced voltage exactly in proportion to the strain can be obtained since two kinds of exciting voltages are applied in time division and the bridge output voltages are processed.

(ii) The above influence of the thermal electromotive force and the drift voltage can be removed only by arranging two or more of the exciting voltages, and a relative measurement is made by using two of the exciting voltges. This further gives the advantage of easy switching of the range of amount of strain, so that the measuring time can be shortened.

(iii) Since there is no need for switching the output of the driver circuit of the bridge circuit, the switching element is inexpensive.

(iv) The switching element is very simple.

(v) The switching of the amount of the strain and a judgment of excess unbalanced voltage can be made very easily.

The invention may be realized various ways without departing from the spirit of the invention as expressed in the following claims.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A strain measuring device using a Wheatstone bridge circuit comprising:

a bridge current supply source including therein a plurality of bridge excitation voltages of different magnitudes with a predetermined difference between each pair of these magnitudes, an excitation voltage changing switch for switching from one said excitation voltage to another, and a driver circuit for exciting said Wheatstone bridge by the bridge excitation voltage determined by said changing switch plus a spurious drift voltage inherent in the circuit, a voltmeter for measuring output voltage derived from said Wheatstone bridge, said output voltage including an undesirable thermal electromotive force produced inside or outside of said Wheatstone bridge, a memory for memorizing each said measured value, an arithmetic unit for arithmetically processing each said memorized value, and controlling circuit means for controlling said excitation voltage changing switch of the bridge current supply source, and for controlling sequence operation of said voltmeter, said memory, and said arithmetic unit in response to the switching operation of the excitation voltage changing switch, said circuit means for controlling said excitation voltage changing switch of the bridge current supply source including means to excite the Wheatstone bridge circuit by a pair of different excitation voltages in time division relationship, said memory memorizing each measured value measured by said voltmeter, said circuit means for controlling sequence operation then causing said arithmetic unit to subtract one of each pair of the respective measured values memorized in the memory from the other, whereby the spurious components affecting the measurement of strain are removed, including potential error due to said thermal electromotive force produced inside or outside said Wheatstone bridge and sensitivity error due to said drift voltage occurring in the driver circuit of the bridge current source.

2. A strain measuring device as claimed in claim 1, in which:

the bridge current supply source includes therein at least three excitation voltages, each of different value, and additionally comprising a comparator for effecting judgment of the amount of the measured value of the voltmeter, for measuring the output voltage derived from said Wheatstone bridge, said controlling circuit including means controlling the excitation voltage changing switch to select two excitation voltages out of the at least three excitation voltages, so that the difference of the excitation voltages falls into a desired excitation voltage range, properly corresponding to the amount of strain, as based on the judgment of said comparator, and for effecting the measurement, one measured value being subtracted from the other so as to measure the strain by removing measurement errors due to spurious components, such as the thermal electromotive force produced inside or outside of the Wheatstone bridge circuit and the drift voltage occurring in the driver circuit, and to do this by switching between excitation voltages only twice, no matter how many excitation voltage ranges are in the bridge current supply source.

* * * * *